US010763726B2

(12) United States Patent
Lin

(10) Patent No.: US 10,763,726 B2
(45) Date of Patent: Sep. 1, 2020

(54) WHEEL RIM GENERATOR

(71) Applicant: JONATHAN LIVINGSTON ENGINEERING CO., LTD., Taipei (TW)

(72) Inventor: Yi-Chuan Lin, Taipei (TW)

(*) Notice: Subject to any disclaimer, the term of this patent is extended or adjusted under 35 U.S.C. 154(b) by 598 days.

(21) Appl. No.: 15/297,403

(22) Filed: Oct. 19, 2016

(65) Prior Publication Data

US 2017/0117774 A1   Apr. 27, 2017

(30) Foreign Application Priority Data

Oct. 21, 2015   (TW) .............................. 104134483 A

(51) Int. Cl.
| H02K 7/18 | (2006.01) |
| B60C 23/04 | (2006.01) |
| B60C 23/10 | (2006.01) |
| H02K 11/20 | (2016.01) |
| H02K 11/33 | (2016.01) |
| B60B 21/12 | (2006.01) |
| B60C 23/00 | (2006.01) |
| B60C 23/06 | (2006.01) |
| B60C 29/02 | (2006.01) |
| H02K 7/08 | (2006.01) |
| H02K 11/00 | (2016.01) |
| B60C 19/00 | (2006.01) |
| B60R 16/033 | (2006.01) |
| B60R 16/04 | (2006.01) |

(52) U.S. Cl.
CPC .......... H02K 7/1846 (2013.01); B60B 21/12 (2013.01); B60C 23/002 (2013.01); B60C 23/041 (2013.01); B60C 23/0488 (2013.01); B60C 23/0498 (2013.01); B60C 23/064 (2013.01); B60C 23/10 (2013.01); B60C 29/02 (2013.01); H02K 7/08 (2013.01); H02K 7/1876 (2013.01); H02K 11/0094 (2013.01); H02K 11/20 (2016.01); H02K 11/33 (2016.01); B60B 2900/351 (2013.01); B60C 2019/004 (2013.01); B60R 16/033 (2013.01); B60R 16/04 (2013.01)

(58) Field of Classification Search
CPC ............................... H02K 11/33; H02K 11/20
See application file for complete search history.

(56) References Cited

U.S. PATENT DOCUMENTS

| 4,229,728 A | 10/1980 | Tremba | |
| 4,536,668 A * | 8/1985 | Boyer | .................. B60C 23/041 180/65.51 |
| 4,856,849 A * | 8/1989 | Fujii | ......................... B60B 3/02 301/63.107 |
| 5,903,071 A * | 5/1999 | Miyasaka | .............. G04C 10/00 310/38 |

(Continued)

Primary Examiner — Alexander Talpalatski

(57) ABSTRACT

A wheel rim generator is provided, including: a wheel rim having a rim, a disc, and an axis of rotation; a bearing having an outer race and an inner race, said inner race is disposed around said rim within the rim width; a rotor configured to rotate with said outer race, has at least one permanent magnet, and a center of gravity being displaced from said axis of rotation; and a stator configured to rotate with said rim, form at least one magnetic circuit with said rotor, and generate electromotive force with one of constant and changing magnetic flux in said at least one magnetic circuit as said wheel rim rotates.

7 Claims, 6 Drawing Sheets

(56) References Cited

U.S. PATENT DOCUMENTS

| | | | | |
|---|---|---|---|---|
| 6,408,913 | B1* | 6/2002 | Caretta | B60B 21/023 137/227 |
| 7,009,310 | B2* | 3/2006 | Cheung | B60C 23/041 290/1 R |
| 7,126,233 | B2 | 10/2006 | Thomas et al. | |
| 7,403,103 | B2* | 7/2008 | Pearman | H02K 7/1846 340/444 |
| 8,146,413 | B1* | 4/2012 | Grace | B60C 29/06 73/146.8 |
| 8,853,869 | B2* | 10/2014 | Nikolic | H02K 7/1846 290/1 R |
| 2004/0020420 | A1* | 2/2004 | Evans | B60C 23/02 116/34 R |
| 2005/0253468 | A1* | 11/2005 | Zampieri | B60B 5/02 310/75 C |
| 2005/0280322 | A1* | 12/2005 | Tsou | B62J 6/06 310/67 R |
| 2006/0037685 | A1* | 2/2006 | Clements | B60B 23/10 152/396 |
| 2006/0164225 | A1* | 7/2006 | Pearman | B60C 23/041 340/444 |
| 2008/0093955 | A1* | 4/2008 | Lunde | H02K 7/1846 310/67 A |
| 2014/0054993 | A1* | 2/2014 | Hallundbæk | H02K 5/132 310/87 |

* cited by examiner

WHEEL RIM GENERATOR

BACKGROUND OF THE INVENTION

Field of the Invention

The present invention relates generally to the field of electric generators, more specifically to the wheel rim generators powered by the mechanical energy of a rotating vehicle wheel.

Description of the Prior Art

U.S. Pat. No. 4,229,728 discloses an electric generator externally mounted on the wheel axles of a vehicle, which has a rotor center of gravity being displaced from the axis of wheel rotation, so that the rotor always seeks the lowest vertical position, and the motive force for power generation in a rolling environment is naturally provided by gravity.

U.S. Pat. No. 7,126,233 discloses another non-center engagement generator which is implemented within a rotating reference frame, in particular the need for an access to the axis of rotation is eliminated.

Both above patents make use of changing magnetic flux in generator's magnetic circuits to induce electromotive force, consequently an undesirable fluctuating torque caused by attracting and repelling magnetic forces is inevitable, no matter the generator is standing by or turned off.

A smoother running, higher output-power yet robust wheel rim generator is certainly the ultimate goal of all related art, but there seems to exist an air of mystery that has not been fully unveiled, the present invention is therefore such an attempt trying to fulfill the necessity.

SUMMARY OF THE INVENTION

An object of the present invention is to provide an independent electrical power source for each vehicle wheel, so that autonomous tire pressure regulation in each wheel is achievable. Whenever a footprint sensor for the loaded tire is also available, individual footprint area of every pneumatic tire can be further optimized regardless of uneven load distribution of the vehicle.

To achieve the above and other objects, a wheel rim generator is provided, including: a wheel rim having a rim, a disc, and an axis of rotation; a bearing having an outer race and an inner race, said inner race is disposed around said rim within the rim width; a rotor configured to rotate with said outer race, has at least one permanent magnet, and a center of gravity being displaced from said axis of rotation; and a stator configured to rotate with said rim, form at least one magnetic circuit with said rotor, and generate electromotive force with one of constant and changing magnetic flux in said at least one magnetic circuit as said wheel rim rotates.

The followings explain the present invention in detail, the embodiments are explanatory of the present invention and the drawings are illustrative only.

DETAILED DESCRIPTION OF THE PREFERRED EMBODIMENTS

The present invention is a wheel rim generator, comprises a wheel rim, a bearing, a rotor, and a stator.

Said wheel rim 9 has a rim, a disc, and an axis of rotation. Said bearing has an outer race and an inner race, said inner race is disposed around said rim within the rim width. Said rotor is configured to rotate with said outer race, has at least one permanent magnet, and a center of gravity being displaced from said axis of rotation. Said stator is configured to rotate with said rim, form at least one magnetic circuit with said rotor, and generate electromotive force with one of constant and changing magnetic flux in said at least one magnetic circuit as said wheel rim rotates.

Figure 1:
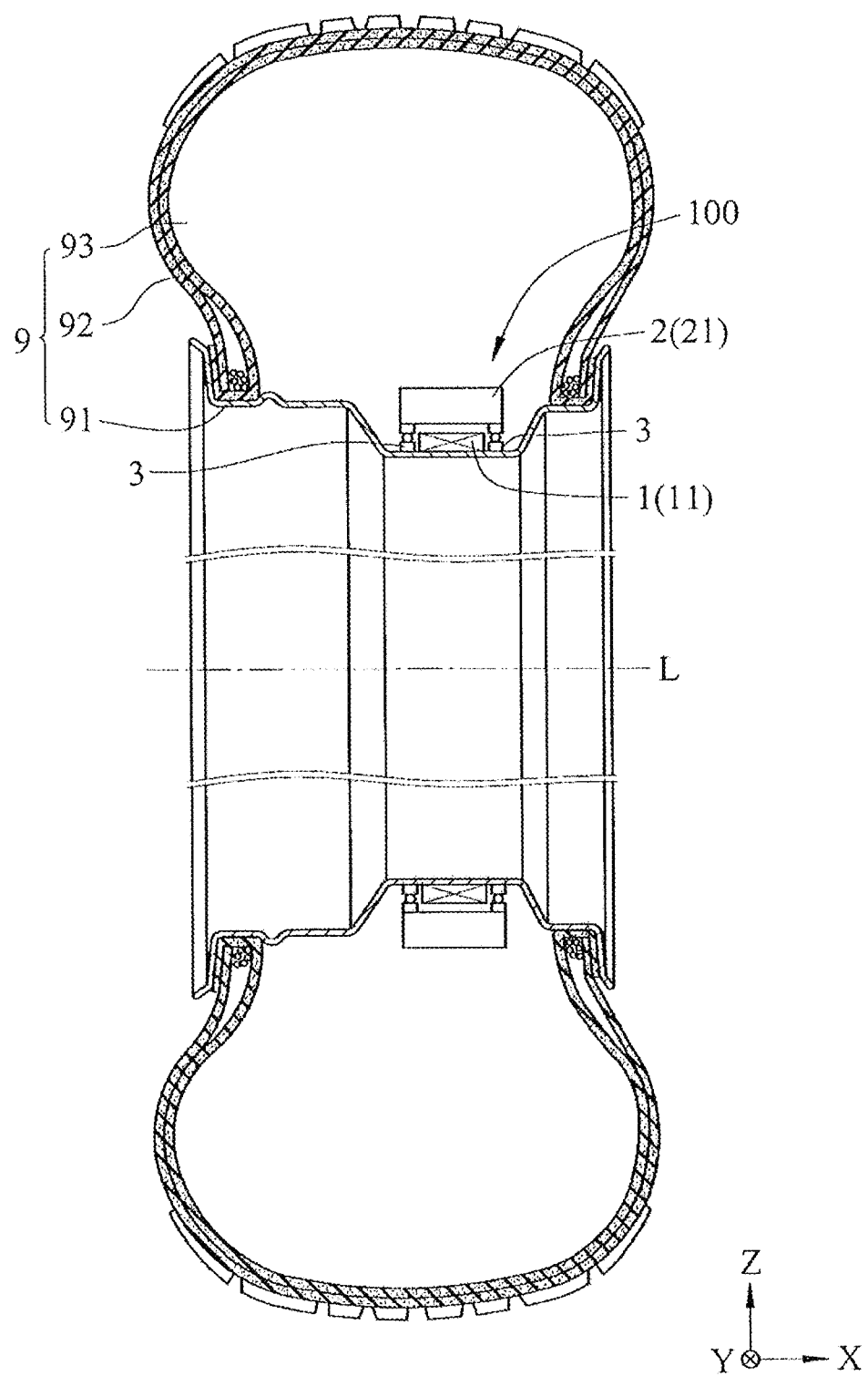
FIG. 1 is a preferred embodiment of the present invention.
Figure 2:
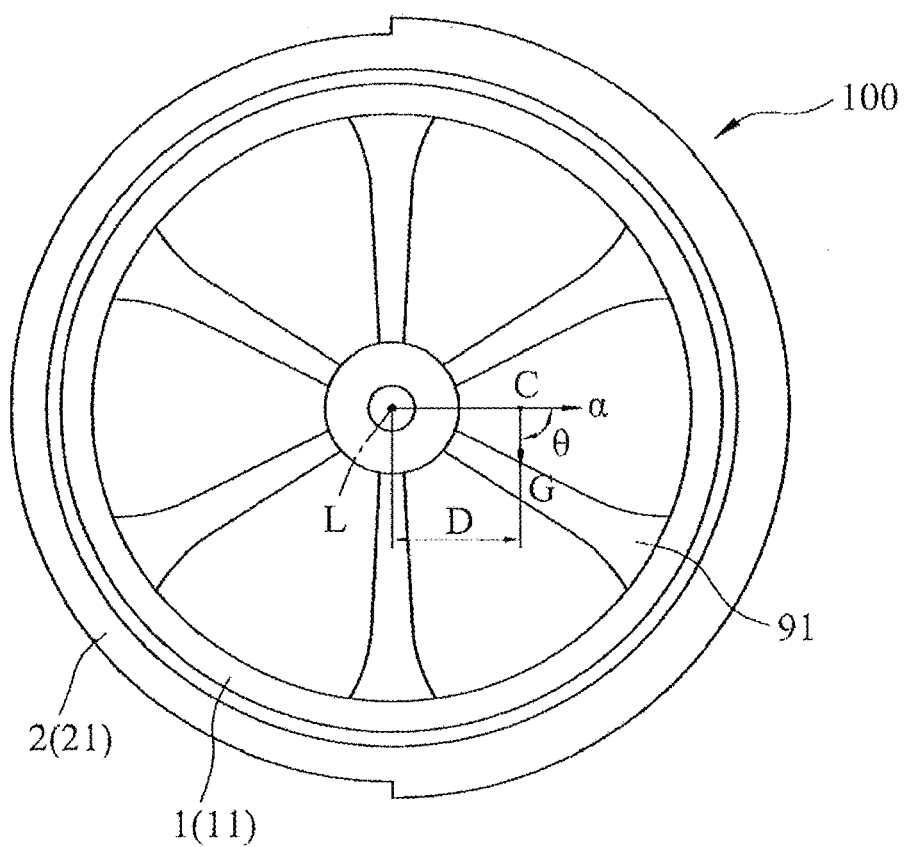
FIG. 2 is illustrative of the displaced CG for the rotor of said preferred embodiment.

FIGS. 1 through 2 represent a preferred embodiment of the present invention. An electric generator 100 is disposed around a tire-sitting rim 91, has a ring-shaped stator 1, a ring-shaped rotor 2, and two ball bearings 3. In said preferred embodiment, said rim is represented by said tire-sitting rim 91, said rim has a flat well base portion 95 being extended to one rim flange 94 of said rim, said bearing is represented by two said ball bearing 3, said rotor is represented by said ring-shaped rotor 2, said stator is represented by said ring-shaped stator 1. Said two ball bearings 3, said ring-shaped rotor 2 and said ring-shaped stator 1 may be sealed in a vacuum space.

Said ring-shaped stator 1 is disposed around said tire-sitting rim 91, rotates with said tire-sitting rim 91 about an axis of rotation L, and comprises a conductor winding 11.

Said ring-shaped rotor 2 rotates freely around said tire-sitting rim 91 about L by the support of two said ball bearing 3, two said ball bearing 3 are also disposed around said tire-sitting rim 91. Said ring-shaped rotor 2 has a center of gravity C being displaced from L, and comprises a magnetic part 21 that can be a permanent magnet, generates electromotive force in said conductor winding 11 whenever said tire-sitting rim 91 rotates.

The shortest distance between L and C is D, the gravity pulling at C is G; define the direction of a line pointing from L to C having a distance D to be α, and define the angle between α and G to be Θ. Therefore the power generating torque is given by $G \cdot D \cdot \operatorname{Sine}(\Theta)$, said power generating torque has a maximum of $G \cdot D$ when Θ equals +90° or −90°.

Figure 3:
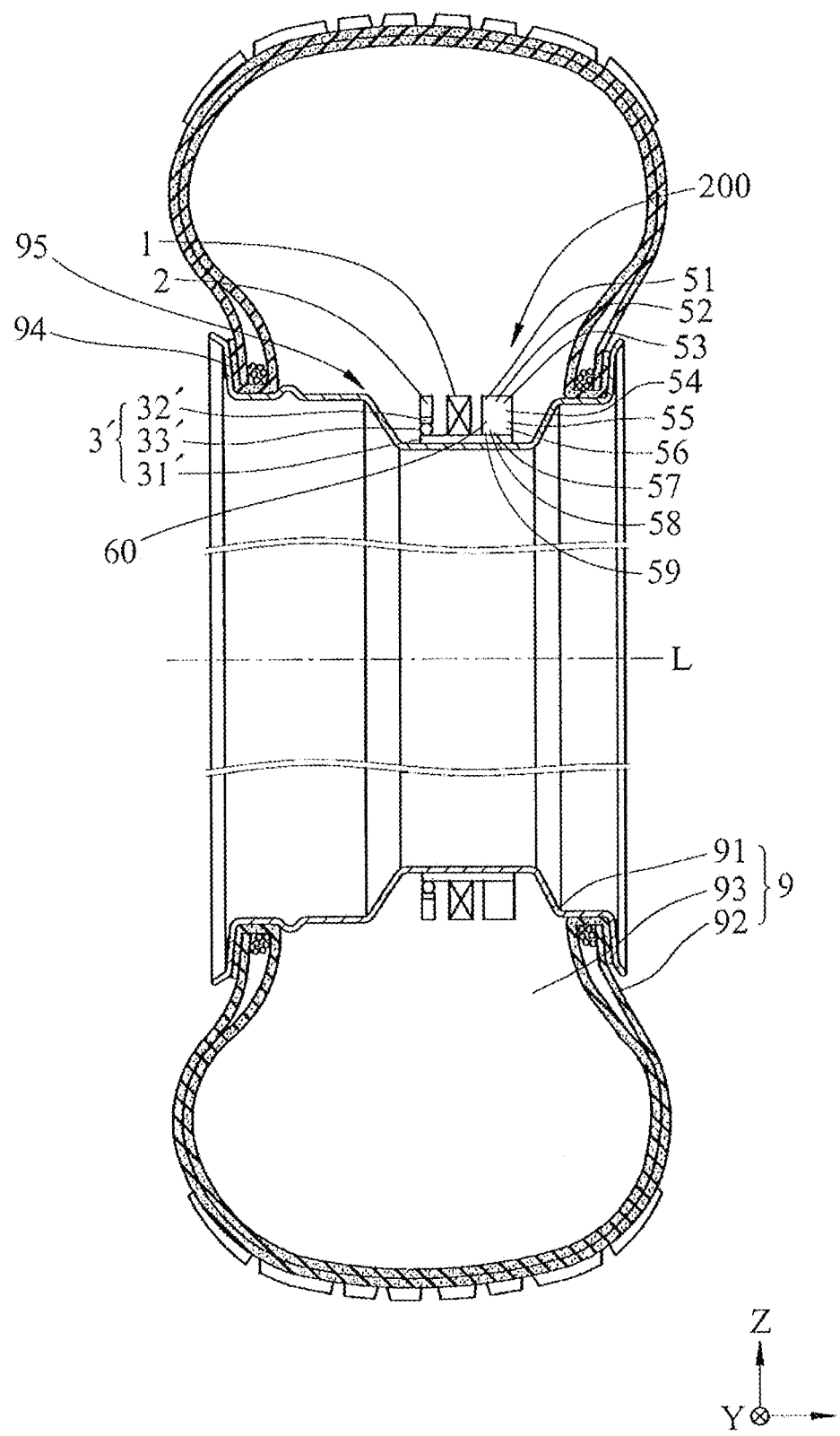
FIG. 3 is the first variant of said preferred embodiment.

FIG. 3 is the first variant of said preferred embodiment. Said ring-shaped stator 1 of an electric generator 200 is disposed around an inner race 31' of a ball bearing 3', said inner race 31' is in turn disposed around said tire-sitting rim 91. Said ring-shaped rotor 2 of said electric generator 200 is configured to rotate with an outer race 32' of said ball bearing 3', a number of rolling balls 33' interface between said inner race 31' and said outer race 32'. A control circuitry 51 is connected to said ring-shaped stator 1 and is attached to said inner race 31', controls Θ to be within +90° and −90° by regulating output current of said conductor winding 11, depending on the direction of advance of said tire-sitting rim 91. Said control circuitry 51 may coordinate a power factor correction unit 58 and a power converter 59 in the control of Θ, the same principle is also applicable to said preferred embodiment.

It is preferable for said electric generator 200 to further comprise a control and processing unit 56, at least one battery 53, both air pressure and air temperature sensors 54, an inflation and deflation system 52, an accelerometer 55, a tire footprint sensor 57, said power factor correction unit 58, and said power converter 59, which are all functionally coupled to said ring-shaped stator 1.

Said control and processing unit 56 has hardware and software combined capabilities of computation, is also built in a storage memory and a wireless transmitter 60. Said inflation and deflation system 52 speaks for the value of a second air valve.

Said tire footprint sensor 57 projects a light beam on a point of tire internal surface perpendicularly from said tire-sitting rim 91, detects rapid and significant changes in the reflection of said light beam due to tire deflection as said point travels across said tire footprint. By analyzing a signal corresponding to said reflection in the opposite direction of said light beam, said tire footprint is characterized by two instants when said point touches and leaves said tire footprint, in addition to the cyclic period of rotation of said tire-sitting rim 91. Hence the central angle of said tire footprint is revealed, leading to the footprint area and further to tire load with a knowledge of tire pressure.

Figure 4:
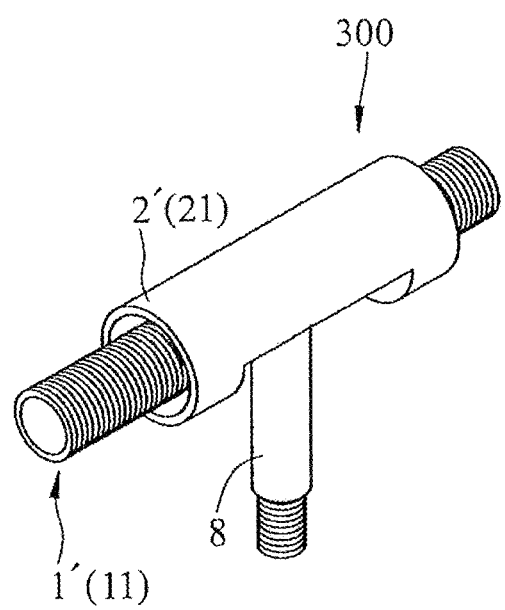
FIG. 4 is the second variant of said preferred embodiment.
Figure 5:
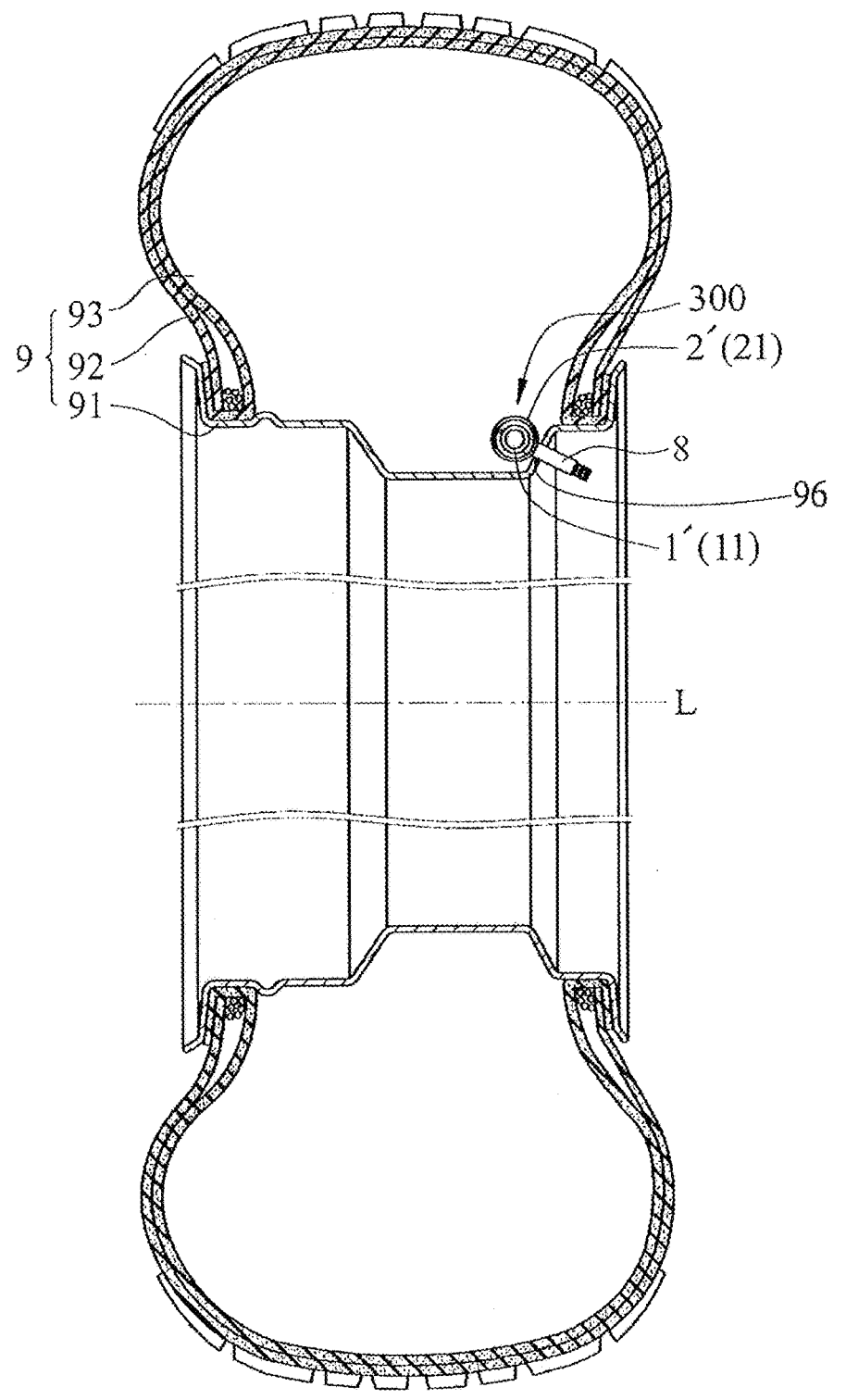
FIG. 5 is a sectional view of a wheel rim fitted with said second variant.
Figure 6:
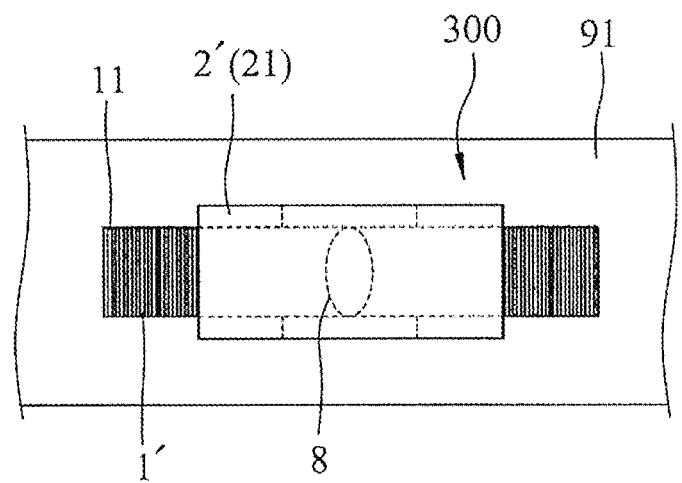
FIG. 6 is a sectional view of said second variant.

FIGS. 4 through 6 represent the second variant of said preferred embodiment, the present invention is expanded from rotational motion to linear motion of gravity-drived power generation, and is scaled down to be implemented in an air valve. Said tire-sitting rim has at least two valve stem holes 96. An electric generator 300 having a valve stem 8 (such as air valve) is fitted to said tire-sitting rim 91, has both a stator 1' and a rotor 2'. Said rotor 2' is configured to form a magnetic circuit with said stator 1', and slide freely between two limit positions of said stator 1'. Said stator 1' has a conductor winding and generates electromotive force in said conductor winding, when said rotor 2' reciprocates by gravity as said tire-sitting rim 91 rotates.

Engineering and theoretical concerns of the present invention are explained in more details in the following.

First, since air drag acting on said rotor inside a tire builds up exponentially with driving speed, therefore it is preferable for said bearing, said rotor, and said stator to be concealed in vacuum at the well base (drop center) portion of said rim, by a dedicated sealing rim covering said well base. Secondly, in order to dispose said bearing, said stator as well as said sealing rim around said rim, said well base portion should be extended to one rim flange of said rim, and said rim flange should be detachable either by screw threads or bolts.

To generate electromotive force according to Faraday's law with constant magnetic flux in a magnetic circuit, move perpendicularly a conductor wire of length l at velocity υ through a magnetic field of flux density B, the potential difference at the two ends of said conductor wire is given by emf=l·υ·B. This implies the air gap in the magnetic circuit of FIG. 3 remains consistent, so as the cross section of said ring-shaped stator 1, thus thinner gauge wire windings taking up the least air gap in said magnetic circuit of FIG. 3 would be the best solution to the end.

The control of $\Theta$ has to take bearing friction into account. The frictional torque of a bearing is given by $T_{bearing}=K_{bearing} \cdot (K_{visc} \cdot N)^{(2/3)}$, where $K_{bearing}$ is a bearing specific constant, $K_{visc}$ is the viscosity of bearing lubricant, and N is the rotational speed of the bearing in rpm. Let $K_{bearing} \cdot (K_{visc} \cdot N_{max})^{(2/3)}=0.1 G \cdot D$ for a highly efficient design with the maximum rotational speed rating being $N_{max}$, so $K_{visc}=((0.1 G \cdot D/K_{bearing})/N_{max}^{(2/3)})^{(3/2)}$. By adjusting $K_{visc}$ and/or the multiplication of G and D to satisfy the last equation, the maximum net torque available for power generation remains equal or greater than 0.9 G·D for all N by design.

Further denote ω for the angular speed and Eff for the efficiency of the generator, and suppose $T_{bearing}$ can be ignored in a practical design. According to the law of energy conservation, mechanical input and electrical output power of the generator is established: $V_{out,rms} \cdot I_{out,rms}=\omega \cdot G \cdot D \cdot \text{Sine}(\Theta) \cdot \text{Eff}$. Thus, $\Theta=\text{Inverse Sine}(I_{out,rms} \cdot (V_{out,rms}/\omega)/(G \cdot D \cdot \text{Eff}))$. Because $V_{out,rms}/\omega$ Eff are nearly constant around an operating point, hence $\Theta$ is mainly controlled by generator output current regardless of the vehicle speed.

But still vehicle deceleration caused by hard braking poses a critical concern, the forward moving inertia of C must be dealt with care in such a situation. One simple solution is to introduce an additional term into the control equation of $\Theta$ to counter react or minimize the undesirable effect, which is proportional to and in the opposite sign of the time-rate of change of ω.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A wheel rim generator, including:
   a wheel rim having a tire bearing rim, a disc, and an axis of rotation;
   a bearing having an outer ring-shaped raceway and an inner ring-shaped raceway, a diameter of said outer ring-shaped raceway being larger than a diameter of said inner ring-shaped raceway, said inner ring-shaped raceway is disposed around and fixed to said tire bearing rim within the rim width, and said outer ring-shaped raceway is configured to rotate relative to said inner ring-shaped raceway without any direct contact in between;
   a rotor configured to rotate with said outer ring-shaped raceway, said rotor has at least one permanent magnet and a center of gravity being displaced from said axis of rotation; and
   a stator configured to rotate with said tire bearing rim,
   said stator forms at least one magnetic circuit with said rotor, and generates electromotive force with one of constant and changing magnetic flux in said at least one magnetic circuit as said wheel rim rotates.

2. The wheel rim generator of claim 1, wherein said bearing, said rotor, and said stator are sealed in a vacuum space.

3. The wheel rim generator of claim 1, wherein said bearing is a ceramic ball bearing.

4. The wheel rim generator of claim 1, wherein said tire bearing rim has a flat well base portion being extended to one rim flange of said tire bearing rim.

5. The wheel rim generator of claim 4, wherein said rim flange is detachable.

6. The wheel rim generator of claim 1, wherein said tire bearing rim has at least two valve stem holes.

7. The wheel rim generator of claim 1, further including at least one battery, an inflation and deflation system, both air pressure and air temperature sensors, an accelerometer, a tire footprint sensor, a wireless transmitter, a power factor correction unit, a power converter, and a control and processing unit.

\* \* \* \* \*